US011438682B2

(12) United States Patent
Abed et al.

(10) Patent No.: US 11,438,682 B2
(45) Date of Patent: Sep. 6, 2022

(54) DIGITAL MICROPHONE WITH REDUCED PROCESSING NOISE

(71) Applicant: Knowles Electronics, LLC, Itasca, IL (US)

(72) Inventors: Adam Abed, Sunnyvale, CA (US); Edwin Cordon, Itasca, IL (US); Niel Warren, Mountain View, CA (US); Donald Sanders, Itasca, IL (US); Maulik Patel, Itasca, IL (US); Dushyant Liya, Itasca, IL (US)

(73) Assignee: KNOWLES ELECTRONICS, LLC, Itasca, IL (US)

( * ) Notice: Subject to any disclaimer, the term of this patent is extended or adjusted under 35 U.S.C. 154(b) by 0 days.

(21) Appl. No.: 17/274,732

(22) PCT Filed: Sep. 10, 2019

(86) PCT No.: PCT/US2019/050484
§ 371 (c)(1),
(2) Date: Mar. 9, 2021

(87) PCT Pub. No.: WO2020/055923
PCT Pub. Date: Mar. 19, 2020

(65) Prior Publication Data
US 2021/0352391 A1     Nov. 11, 2021

Related U.S. Application Data

(60) Provisional application No. 62/729,963, filed on Sep. 11, 2018.

(51) Int. Cl.
*H04R 3/00* (2006.01)
*H04R 1/08* (2006.01)
(Continued)

(52) U.S. Cl.
CPC ............... *H04R 1/08* (2013.01); *H04R 3/00* (2013.01); *G06F 3/05* (2013.01); *G06F 3/16* (2013.01); *H04R 2201/003* (2013.01)

(58) Field of Classification Search
CPC ......... H04R 3/00; H04R 3/002; H04R 3/005; H04R 3/04; H04R 1/00; H04R 1/02;
(Continued)

(56) References Cited

U.S. PATENT DOCUMENTS 5,822,598 A    10/1998  Lam
6,070,140 A     5/2000  Tran
(Continued)

FOREIGN PATENT DOCUMENTS

EP       1 585 362 A2    10/2005

OTHER PUBLICATIONS

International Search Report and Written Opinion issued in International Application No. PCT/US2019/050484 dated Nov. 25, 2019.
(Continued)

*Primary Examiner* — Thang V Tran
(74) *Attorney, Agent, or Firm* — Foley & Lardner LLP

(57) ABSTRACT

A microphone assembly includes a housing including a base, a cover, and a sound port. The microphone assembly further includes an acoustic transducer and an electrical circuit, both of which are disposed in an enclosed volume of the housing. The transducer and electrical circuit work in concert to convert sound waves into a processed digital audio signal. The electrical circuit is configured to process digital data in a series of frames that correspond to a fixed period in time. The electrical circuit is further configured to reduce noise in the resulting signal by varying the current draw required in a randomized or pseudo-randomized fashion between adjacent frames of digital data.

20 Claims, 6 Drawing Sheets

(51) Int. Cl.
    *G06F 3/00*         (2006.01)
    *G06F 3/05*         (2006.01)
    *G06F 3/16*         (2006.01)

(58) Field of Classification Search
    CPC .......... H04R 1/08; H04R 1/083; H04R 19/00;
                   H04R 19/005; H04R 19/04; H04R
                   2410/03; H04R 2201/003; G06F 3/05;
                   G06F 3/16; G06F 3/165; H03M 1/12;
                   H03M 1/124; H03M 1/14; H03M 7/00;
                                G10L 19/00; G10L 21/00
    See application file for complete search history.

(56) References Cited

U.S. PATENT DOCUMENTS

| | | | |
|---|---|---|---|
| 6,154,721 | A | 11/2000 | Sonnic |
| 6,249,757 | B1 | 6/2001 | Cason |
| 6,397,186 | B1 | 5/2002 | Bush et al. |
| 6,756,700 | B2 | 6/2004 | Zeng |
| 7,415,416 | B2 | 8/2008 | Rees |
| 7,774,204 | B2 | 8/2010 | Mozer et al. |
| 7,957,972 | B2 | 6/2011 | Huang et al. |
| 8,275,148 | B2 | 9/2012 | Li et al. |
| 8,666,751 | B2 | 3/2014 | Murthi et al. |
| 8,972,252 | B2 | 3/2015 | Hung et al. |
| 8,996,381 | B2 | 3/2015 | Mozer et al. |
| 9,043,211 | B2 | 5/2015 | Haiut et al. |
| 9,112,984 | B2 | 8/2015 | Sejnoha et al. |
| 2006/0074658 | A1 | 4/2006 | Chadha |
| 2012/0232896 | A1 | 9/2012 | Taleb et al. |
| 2012/0310641 | A1 | 12/2012 | Niemisto et al. |
| 2013/0223635 | A1 | 8/2013 | Singer et al. |
| 2014/0163978 | A1 | 6/2014 | Basye et al. |
| 2014/0244269 | A1 | 8/2014 | Tokutake |
| 2014/0254837 | A1* | 9/2014 | Mortensen ................ H03F 3/68 381/120 |
| 2014/0257821 | A1 | 9/2014 | Adams et al. |
| 2014/0274203 | A1 | 9/2014 | Ganong et al. |
| 2014/0278435 | A1 | 9/2014 | Ganong et al. |
| 2014/0281628 | A1 | 9/2014 | Nigam et al. |
| 2014/0343949 | A1 | 11/2014 | Huang et al. |
| 2015/0106085 | A1 | 4/2015 | Lindahl |
| 2015/0112690 | A1 | 4/2015 | Guha et al. |
| 2015/0134331 | A1 | 5/2015 | Millet et al. |
| 2015/0350772 | A1* | 12/2015 | Oliaei ...................... H04R 1/04 381/111 |
| 2016/0344358 | A1* | 11/2016 | Oliaei ...................... H04R 1/08 |
| 2017/0154620 | A1* | 6/2017 | Berthelsen ............ G10L 15/16 |
| 2017/0230750 | A1* | 8/2017 | Pawlowski .............. H04R 1/08 |
| 2018/0167727 | A1 | 6/2018 | Pawlowski et al. |

OTHER PUBLICATIONS

Mohd-Yasin et al., "Topical Review; Noise in MEMS," Measurement Science and Technology, IOP, Bristol, GB, vol. 21, No. 1, Jan. 1, 2010, p. 12001, XP020168476, ISSN: 0957-0233.

* cited by examiner

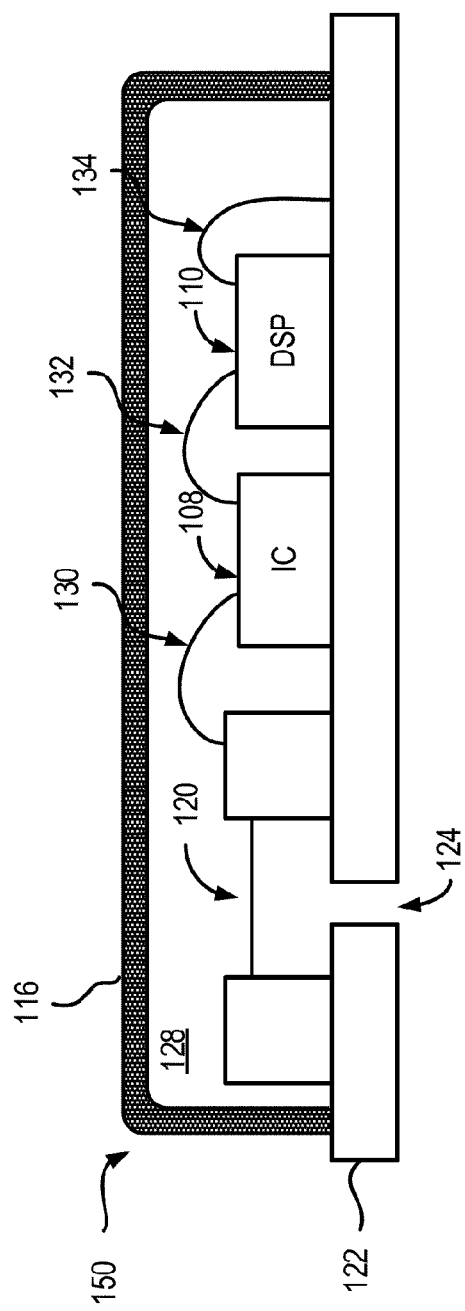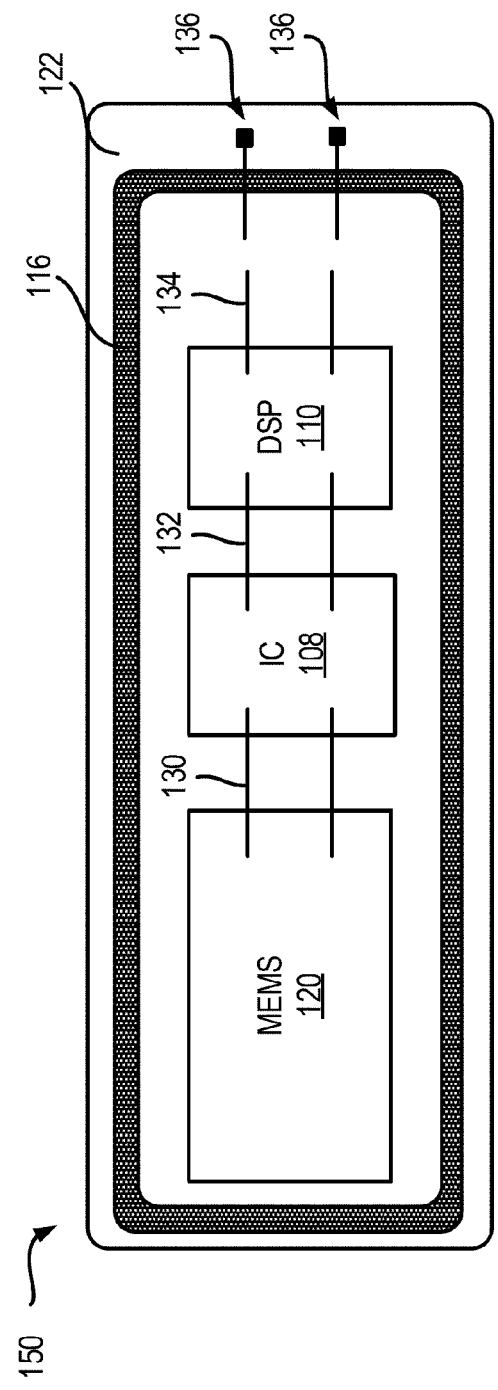
FIG. 1A
FIG. 1B

DIGITAL MICROPHONE WITH REDUCED PROCESSING NOISE

CROSS REFERENCE TO RELATED APPLICATIONS

This application is a National Stage Application of PCT/US2019/050484, filed Sep. 10, 2019, which claims the benefit of and priority to U.S. Provisional Patent Application No. 62/729,963, filed Sep. 11, 2018, the entire contents of which are incorporated herein by reference.

BACKGROUND

The present disclosure relates generally to microphones, particularly microphones utilized in compact computing products including smartphones, smart speakers, internet of things (IoT) devices, mobile phones, tablets, etc. There exists a need to improve the sound quality of such microphones without significantly impacting size or performance.

SUMMARY

A first aspect relates to a microphone assembly including a housing, an acoustic transducer, and an electrical circuit. The housing includes a base, a cover, and a sound port. The acoustic transducer and the electrical circuit are disposed in the housing. An input of the electrical circuit is coupled to an output of the transducer. The electrical circuit includes an analog-to-digital converter configured to convert the output of the transducer to digital data. The electrical circuit is configured to process the digital data during discrete time periods distributed throughout frames of a sequence of frames, where for a given frame, at least some discrete time periods during which digital data are processed are adjacent discrete time periods during which digital data are not processed. The distribution of discrete time periods during which digital data are processed is different from frame to frame.

A second aspect relates to a method of processing audio data. The method includes converting an acoustic signal to an electrical signal and converting the electrical signal into digital data representing the acoustic signal. The method also includes processing the digital data in time frames of a sequence of time frames by intermittently processing the digital data in a given time frame during a plurality of discrete time periods distributed throughout a duration of the given time frame. At least some of the discrete time periods during which digital data are processed are adjacent discrete time periods during which digital data are not processed. The method further includes varying a distribution of discrete time periods during which digital data are processed from one time frame to a subsequent time frame of the plurality of time frames.

A third aspect relates to a microphone assembly including an electrical circuit. The electrical circuit includes an analog-to-digital converter configured to convert an output of the transducer to digital data at a first clock frequency. The electrical circuit is configured to process the digital data in time frames of a sequence of a plurality of time frames at a second clock frequency. The electrical circuit is configured to vary the second clock frequency from one time frame to a subsequent time frame of the plurality of time frames.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. Various embodiments are described in more detail below in connection with the appended drawings.

FIG. 1A is a sectional side view of a microphone assembly.

FIG. 1B is a sectional top view of the microphone assembly of FIG. 1A.

Figure 2:
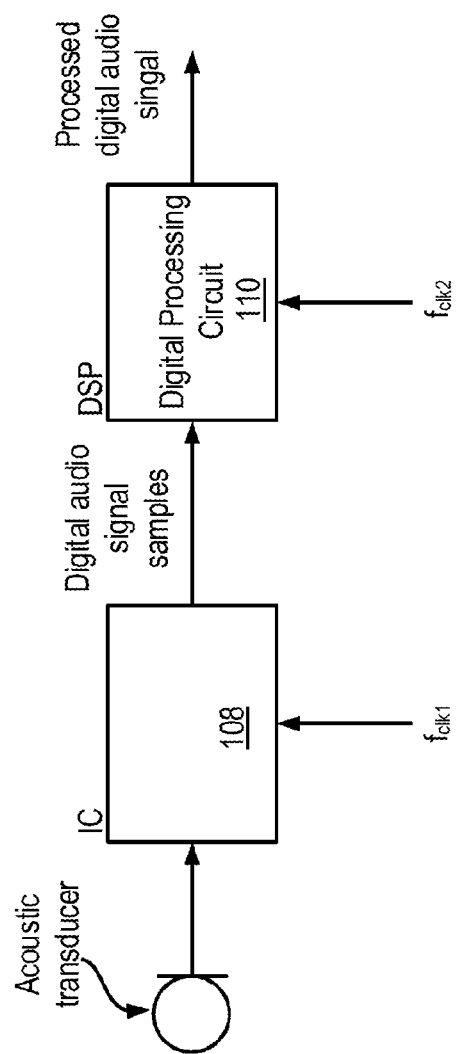
FIG. 2 is block diagram of an audio signal processing circuit for a microphone assembly.

In the following detailed description, various embodiments are described with reference to the appended drawings. The skilled person will understand that the accompanying drawings are schematic and simplified for clarity and therefore merely show details which are essential to the understanding of the disclosure, while other details have been left out. Like reference numerals refer to like elements or components throughout. Like elements or components will therefore not necessarily be described in detail with respect to each figure.

DETAILED DESCRIPTION

In general, disclosed herein are systems and methods for reducing noise in a microphone. The microphone is configured to process an acoustic signal in discrete blocks or "frames" of digital data. In traditional microphones, the processing of each frame is performed periodically, typically at the beginning of each frame. When the necessary processing is complete for a given frame, the processor goes into a low power idle mode to await the next frame (and the next batch of data for processing). This processing approach, used in traditional microphone processing operations, results in periodic current modulation that occurs within the audible frequency spectrum, resulting in tones and harmonics that are clearly audible to an end listener. The signature of this acoustic disturbance correlates precisely with the frequency of current modulation and its magnitude is proportional to the magnitude of current change. The systems and methods disclosed herein have been developed to reduce noise resulting from this periodic or frame-based processing of digital data.

One aspect of the present disclosure relates to a microphone assembly including a (microphone) housing including a base, a cover, and a sound port. The microphone assembly further includes an acoustic transducer disposed in the housing, and an analog-to-digital converter configured to convert a microphone signal voltage received from the acoustic transducer to digital data, which is recorded and processed in a sequence of frames. A processing circuit is configured to process the digital data received during discrete time periods within each frame. The processing circuit is further configured to modify the behavior of the processor between frames (e.g., by varying the temporal distribution of the discrete time periods from frame to frame, etc.) to reduce signal noise. The details of the general depiction provided above will be more fully explained by reference to FIGS. 1-6.

FIGS. 1A and 1B show a microphone assembly, shown as assembly 150, according to an illustrative embodiment. The assembly includes a housing including a base, shown as substrate 122, a cover, shown as housing lid 116, and a sound port 124. In FIG. 1A, the housing lid 116 is coupled to the substrate 122 (e.g., the housing lid 116 is mounted onto a peripheral edge of the substrate 122). Together, the housing lid 116 and the substrate 122 form an enclosed volume 128 for the assembly 150. The sound port 124 is disposed on the substrate 122 and is configured to convey sound waves to an acoustic transducer 120 (e.g., a microelectromechanical system (MEMS) transducer), located within the enclosed volume 128. In alternative embodiments, the sound port 124 is disposed on the housing lid 116 or on a side wall of the housing. In some embodiments, the assembly may form part of a compact computing device (e.g., a portable communication device, a smartphone, a smart speaker, an IoT device, etc.), where one, two, three or more assemblies may be integrated for picking-up and processing various types of acoustic signals such as speech and music. In some embodiments, the acoustic transducer 120 is fabricated using microelectromechanical systems (MEMS) or some other technology. The transducer may be a capacitive device including a movable diaphragm and a back plate. In such embodiments, acoustic activity moves the diaphragm relative to the back plate causing a change in capacitance and generating an electrical signal indicative of the acoustic activity. Alternatively, the transducer may be embodied as a piezoelectric device or some other known or future transduction device.

In FIGS. 1A and 1B, the assembly 150 further includes an electrical circuit disposed in the enclosed volume 128. The electrical circuit includes an integrated circuit (IC) 108. In some embodiments, the integrated circuit 108 is an application specific integrated circuit (ASIC). In some embodiments, the integrated circuit 108 includes a semiconductor die integrating various analog, analog-to-digital, and digital circuits disclosed herein. The electrical circuit also includes a digital signal processor (DSP), shown as DSP 110. The DSP may be a discrete device or it may be integrated with the IC 108. The IC and DSP are shown side-by-side but may also be stacked. In some implementations, the DSP 110 is configured to control the operation of a command and control interface connectable to a processor of a host device, e.g. a portable, communication device, smartphone, etc. The DSP 110 may include a communication interface compliant with, and connected to, an externally accessible communication interface of the microphone assembly 150. The communication interface may include a proprietary or standardized data interface, such as SoundWire, SPI or PDM among other known or future data interfaces. The command and control interface may include a proprietary or standardized interface such as I²C, USB, UART or SoundWire among other known or future interfaces. In the embodiment of FIGS. 1A and 1B, the DSP 110 is electrically connected to the integrated circuit 108 by bonding wires 132 on one end, and to traces disposed on the substrate 122 on the other (e.g., via bonding wires 134).

In the embodiment of FIGS. 1A and 1B, the integrated circuit 108 is sized and shaped for mounting to the substrate 122. The substrate 122 likewise supports the acoustic transducer 120, and DSP 110. In other embodiments, the transducer may be mounted on the cover or lid. The IC 108 may be partially or fully embedded in the substrate or disposed in some other location in the housing.

The acoustic transducer 120 converts sound waves received through sound port 124 into a corresponding electrical microphone signal. The acoustic transducer 120 generates an electrical signal (e.g., a voltage) at a transducer output in response to acoustic activity incident on the port 124. As shown in FIGS. 1A-1B, the transducer output includes a pad or terminal of acoustic transducer 120 that is electrically connected to the electrical circuit via one or more bonding wires 130. The assembly 150 of FIGS. 1A-1B further includes electrical contacts, shown schematically as contacts 136, typically disposed on a bottom surface of the substrate 122. The contacts 136 are electrically coupled to the electrical circuit. The contacts 136 are configured to electrically connect the microphone assembly to one of a variety of host devices.

Together, the integrated circuit 108 and the DSP 110 form an audio signal conditioning and processing circuit for the assembly 150. In an illustrative embodiment, as shown in FIG. 2, the integrated circuit 108 receives an analog output signal from the acoustic transducer 120. The analog output signal may be amplified or buffered and filtered before processing by the analog-to-digital converter, which transforms the signal into digital data. The digital data is generated at a rate determined by the clock frequency of the integrated circuit 108. In the embodiment of FIG. 2, the digital data is generated at a fixed clock frequency, shown as first clock frequency, $f_{clk1}$, and stored in a digital data buffer in physical memory. In some embodiments, the digital data is retained in a buffer for a predetermined period of time. The DSP 110 samples groups or frames of digital data from the buffer, each frame consisting of a predetermined number of data points (e.g., a set of data points taken over a predetermined period of time). In some implementations, processing by the DSP 110 is conditioned on an event like the detection of voice activity, a key word, etc.

In an illustrative embodiment, the analog-to-digital converter is configured to provide a single chunk of data to the DSP 110 at a fixed sampling rate, or frame rate, which has a duration corresponding to a frequency within a range of human perceptible frequencies (e.g., between 20 Hz and 20 kHz). However, the frequency range may be more or less. In some embodiments, the frequency range range is between about 60 and 100 Hz. Once received by the DSP 110, an acoustic analysis is performed (e.g., a series of calculations are performed based on a predetermined algorithm), resulting in a processed digital audio signal that is output to an end device. In some implementations, the acoustic analysis consists of data processing routines used to decipher words or phrases from the digital data and perform authentication, among other functionality. In other implementations, algorithms are used to perform an ultrasonic analysis (e.g., for a range finder) from the digital data. The duration of the processing step is a function of the clock frequency of the digital processing circuit, shown as second clock frequency, $f_{clk2}$, which, as shown in FIG. 2, may be different from the first clock frequency, $f_{clk1}$, of the integrated circuit 108. The electrical circuit is configured to process the digital audio signal of each frame within one frame period. For example, for a frame rate of 60 Hz, the processing of a single frame is completed within approximately 16 ms.

Figure 3:
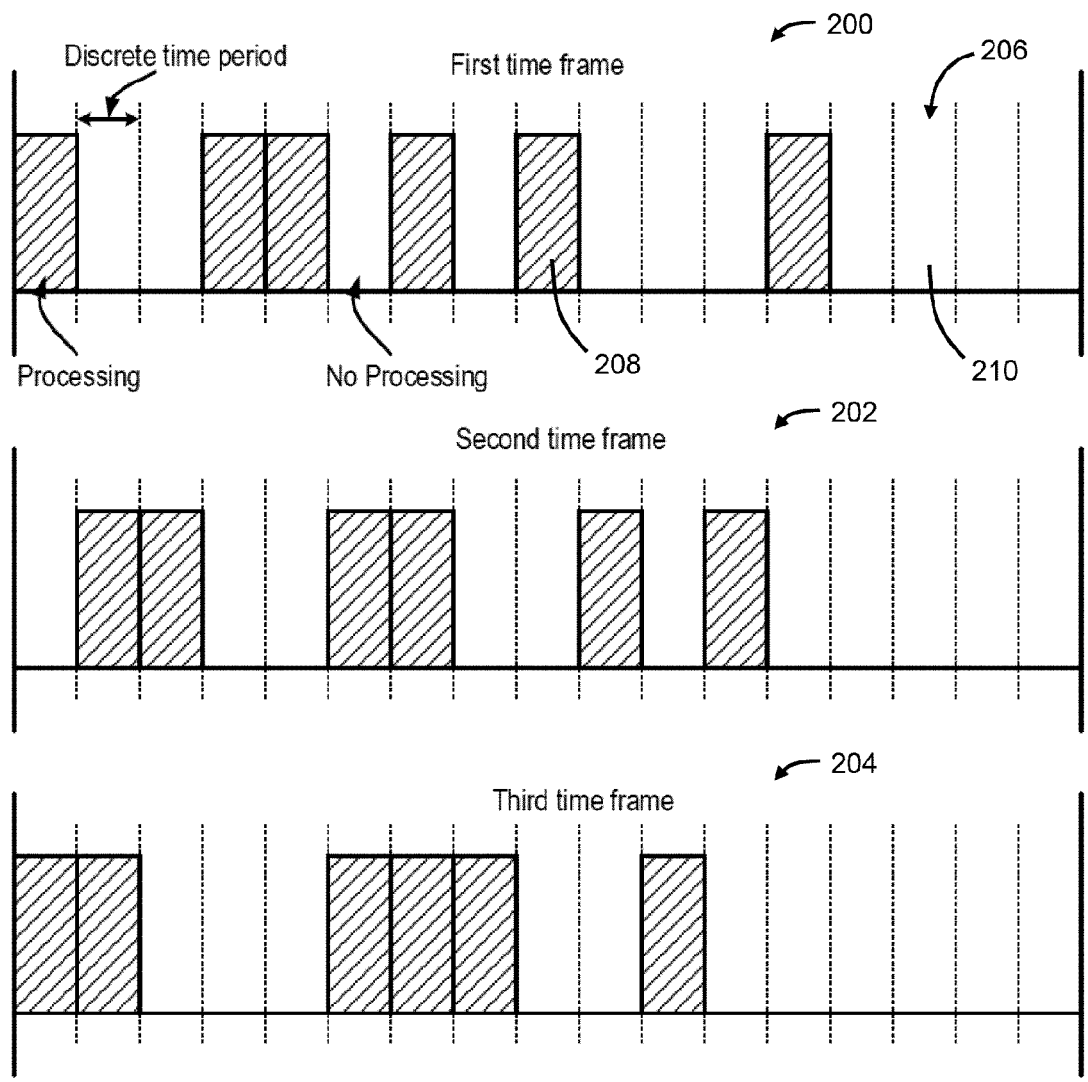
FIG. 3 is a schematic illustration of an audio signal processing technique for a microphone assembly.

In FIG. 3, the electrical circuit is configured to process the digital data during discrete time periods distributed throughout frames of a sequence of frames. FIG. 3 shows a series of three frames, a first frame 200, a second frame 202 arriving just after the first frame 200, and a third frame 204 arriving after both the first and second frames 200, 202. Within each individual frame, the electrical circuit is configured to subdivide the digital data into a series of discrete time periods, shown as periods 206. The duration of each of the periods 206 shown in FIG. 3 is approximately equal. Moreover, the duration of each of the periods 206 is constant between each of the first, second, and third frames 200, 202, 204. In other embodiments, the duration of each of the time periods may be different and/or vary between frames without departing from the principles of the present disclosure. The discretization of each frame 200, 202, 204 may be implemented in the microphone assembly 150 in a variety of ways (e.g., by introducing a high frequency interrupt in the firmware for the microphone assembly 150, by introducing a state machine in the assembly hardware that gates the clock to the processor, etc.). In general, the smaller the duration of each period 206, the more effective the suppression of acoustic disturbances in the assembly 150.

Generally, the distribution of discrete time periods during which digital data are processed is different from frame to frame. For example, within each frame 200, 202, 204, the electrical circuit is configured to process digital data based on a decision, with a random outcome, made before each of the periods 206. In each of the frames 200, 202, 204 shown in FIG. 3, the processing function is indicated by slashed blocks, shown as processing blocks 208. Periods 206 where no processing occurs (e.g., periods 206 where the processor returns to an idle mode) are indicated by empty blocks, shown as idle blocks 210. In a given period 206, the decision of whether or not to process the data is determined randomly, which includes pseudo-random decisions. In an illustrative embodiment, the decision to process the data is determined by sequencing through a table. The table is configured so that the probability of the occurrence of processing versus not processing is based from the knowledge of the processing algorithm as well as the duty cycle performed in the first period 206 of the frame 200, 202, 204.

The second clock frequency, $f_{clk2}$, is the same in each of the frames 200, 202, 204 shown in FIG. 3. Accordingly, the number of processing blocks 208 across each frame 200, 202, 204 is also the same. In each of the first, second, and third frames 200, 202, 204, at least some of the periods 206 during which digital data are processed are adjacent to discrete time periods during which digital data are not processed. Furthermore, in each of the frames 200, 202, 204, the distribution of periods 206 during which digital data are processed is different. For example, in the first frame 200, processing begins immediately during the first period 206, whereas in the second frame 202, processing hasn't begun until the second discrete time period 206. The processing pattern between frames 200, 202, 204 is also different, which significantly reduces the level of acoustic disturbance in the resulting audio signal.

FIG. 3 provides an example of frames 200, 202, 204 with processing blocks 208 that are randomly distributed across each frame 200, 202, 204 and between frames 200, 202, 204. In other embodiments, the decision to process the data may be distributed differently. For example, the processing blocks may utilize a series of preselected patterns, which may or may not be selected randomly between frames, or another implementation that suitably attenuates acoustic disturbances.

Figure 4:
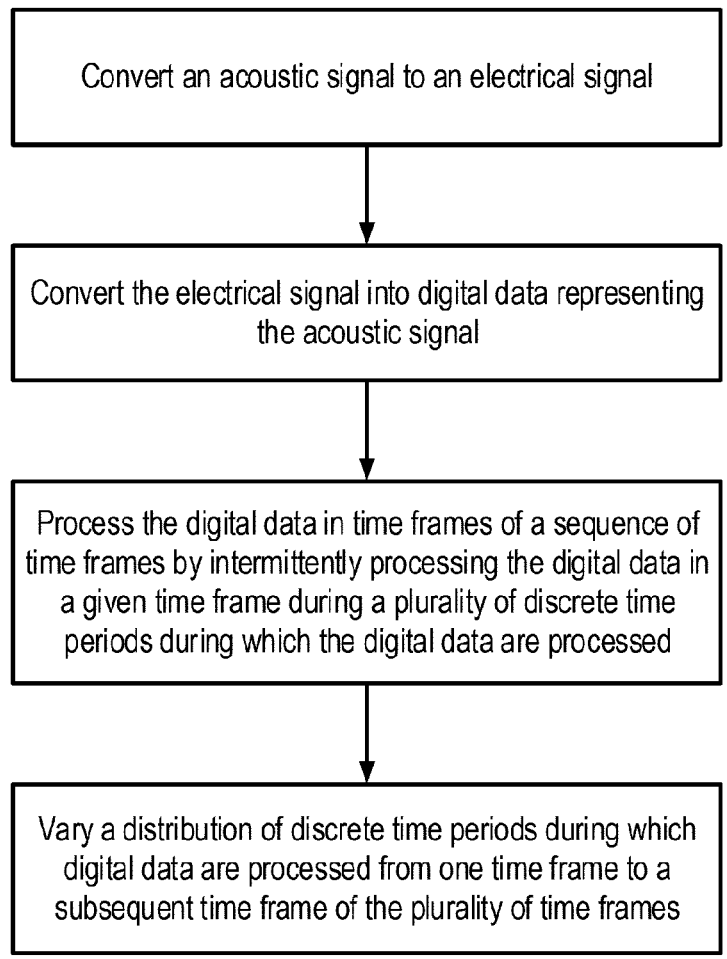
FIG. 4 is a block diagram describing the audio signal processing techniques of FIG. 3.

A method of reducing the level of acoustic disturbances in a microphone assembly (e.g., the assembly 150 of FIG. 1A) is provided in FIG. 4. The method includes converting an acoustic signal (e.g., from sound waves received through sound port 124) to an electrical signal (e.g., a voltage signal output from the acoustic transducer 120 and received by the electrical circuit for further processing). The method further includes converting the electrical signal into digital data representing the acoustic signal as performed by the analog-to-digital converter in the microphone assembly 150 (see FIG. 1A). The method further includes processing the digital data in chunks or frames (e.g., a grouping of digital data points distributed evenly in time) by intermittently processing the digital data in discrete time periods within a given frame. As in the illustrative embodiment of FIG. 3, a decision is made in advance of each discrete time period about whether or not to proceed with processing or to return the processor to an idle mode. The decision process is configured to ensure that all processing is complete by the end of the frame. The method concludes by varying a distribution of discrete time periods during which digital data are processed between frames (e.g., from one time frame to a subsequent time frame of the plurality of time frames), thereby suppressing the periodicity of current modulation within each frame. In some implementations, the processing of no-op commands may consume less power than the processing of data.

Figure 5:
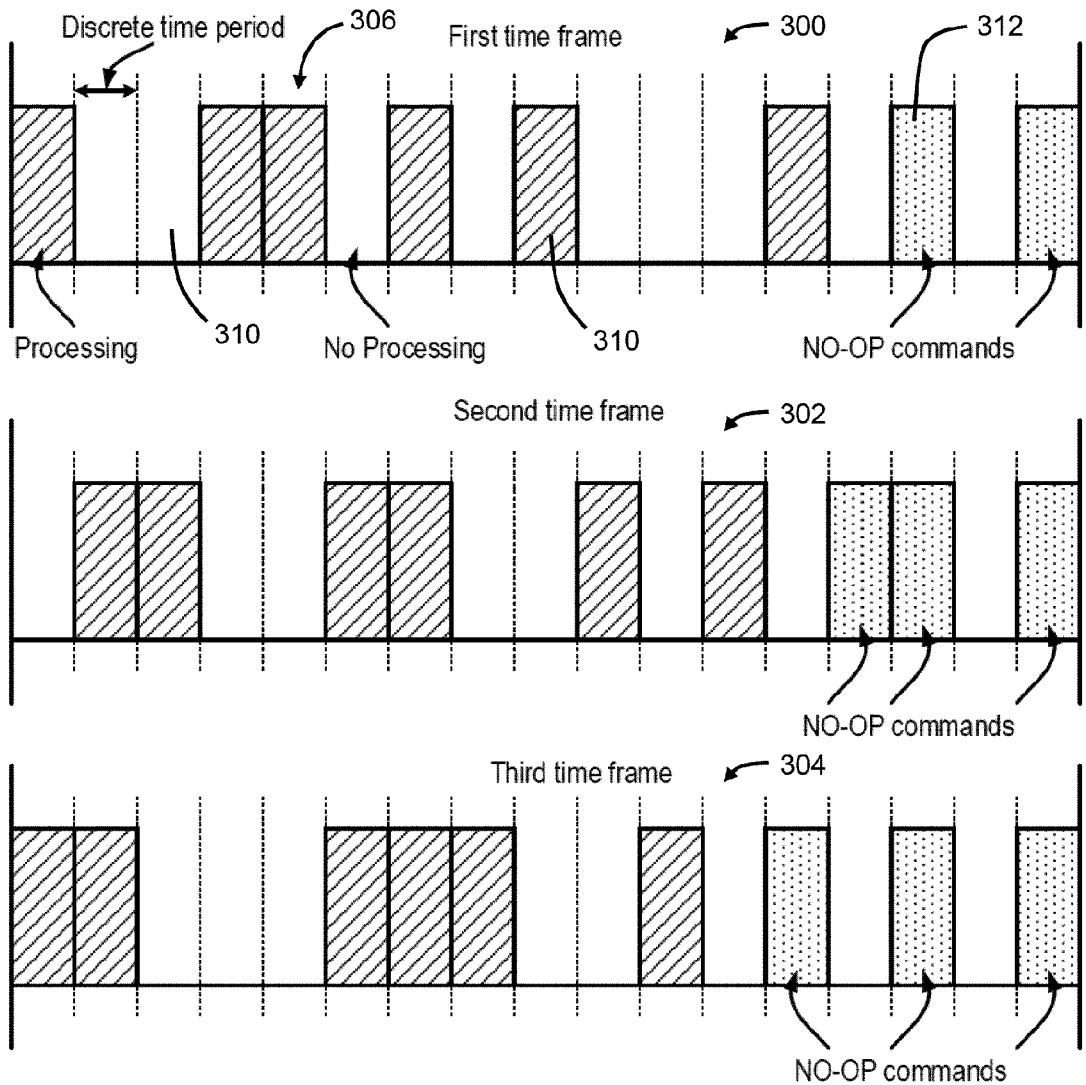
FIG. 5 is a schematic illustration of an audio signal processing technique for a microphone assembly that includes no-operation commands.

FIG. 5 is a schematic illustration of an audio signal processing technique that incorporates the data processing techniques of FIG. 3 along with a series of no-operation (no-op) commands, according to an illustrative embodiment. No-op commands are processing instructions that are configured to minimize the variation in the power drawn by the processor across a given frame. A set of commands for a no-op command algorithm may be generated by matching the current draw observed when operating the microphone assembly 150 (see FIG. 1A) in simulation or real time. The power consumption of the electrical circuit during discrete time periods in which either digital data or no-op commands are processed is greater than the power consumption of the electrical circuit during discrete time periods during which digital data and no-op commands are not processed.

Similar to FIG. 3, FIG. 5 shows a first frame 300, a second frame 302, and a third frame 304, each frame 300, 302, 304 of equal duration and distributed evenly in time. Each frame 300, 302, 304 further includes a first portion that occurs toward the beginning of each frame 300, 302, 304 and a second portion that commences immediately after the first portion is complete. As shown in FIG. 5, the electrical circuit is configured to process the digital data in each frame 300, 302, 304 during the first portion of the frame duration, which is depicted in FIG. 5 as a randomized distribution of processing blocks 308 and idle blocks 310.

The distribution of processing blocks 308 and idle blocks 310 shown in FIG. 5 is equivalent to the distribution shown in FIG. 3. In both embodiments (FIG. 3 and FIG. 5), the distribution of processing blocks is weighted toward the beginning of the frame as shown in frames 200, 202, 204 in FIG. 3. In various alternative embodiments, the distribution of processing blocks may be weighted toward a different part of the frame (e.g., the middle of the frame or the end of the frame), depending on the decision process implemented by the electrical circuit. Although randomized, the distribution of processing blocks between adjacent frames may be weighted to a similar part of the frame, resulting in a source of noise in the processed digital audio signal. The electrical circuit in the embodiment of FIG. 5 reduces this source of noise by incorporating a series of no-op commands, shown as no-op blocks 312, which are randomly distributed throughout the second portion of the frame 300, 302, 304. The no-op commands provide a more constant power draw over the entire duration of the frame 300, 302, 304. In an alternative embodiment, each of the idle blocks 310 are replaced with no-op blocks 312, resulting in nearly uniform power draw.

Figure 6:
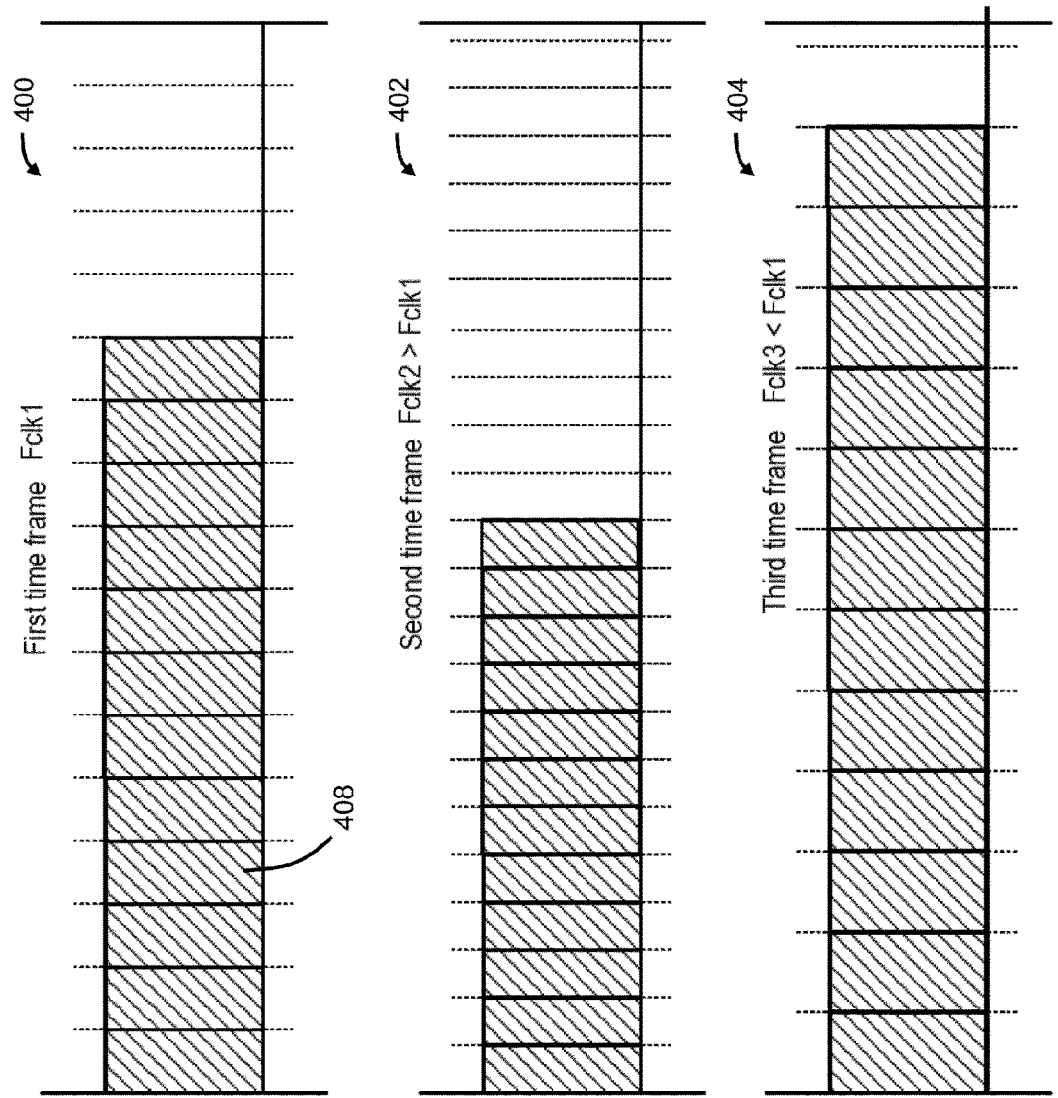
FIG. 6 is a schematic illustration of an audio signal processing technique for a microphone assembly that varies a clock frequency between frames.

In yet another illustrative embodiment, as shown in FIG. 6, the electrical circuit for the microphone assembly 150 (see FIG. 1A) is configured to vary the second clock frequency from one frame to a subsequent frame of the plurality of frames. FIG. 6 shows a series of three frames distributed evenly in time, a first frame 400, a second frame 402, and a third frame 404. The duration of each frame 400, 402, 404 is approximately the same (the frame rate is approximately the same for each frame 400, 402, 404). However, unlike the embodiments of FIGS. 3 and 5, the second clock frequency (e.g., the clock frequency of the DSP 110 of FIG. 1A) in each frame 400, 402, 404 is different. As shown in FIG. 6, the number of processing blocks 408 is the same for each of the first, second, and third frames 400, 402, 404. However, the duration of each of the processing blocks 408 decreases with increasing clock frequency. In the embodiment of FIG. 6, the electrical circuit is configured to randomly vary the second clock frequency from one frame 400, 402, 404 to a subsequent frame 400, 402, 404. The first frame 400 has a second clock frequency, $f_{clk2,1}$, that is greater than the second clock frequency, $f_{clk2,3}$, of the third frame 404. The second frame 402 has a second clock frequency, $f_{clk2,2}$, that is greater than the second clock frequency, $f_{clk2,1}$, $f_{clk2,2}$, in both the first and second frames 400, 402. As shown in FIG. 6, varying the second clock frequency reduces the periodic nature of the current modulation in the electrical circuit, thereby reducing noise in the processed audio signal.

Varying the second clock frequency between frames 400, 402, 404 also has the potential to reduce the power consumption of the electrical circuit, at least in comparison to other approaches to noise reduction, as no additional commands are executed beyond the original processing algorithm. Like other approaches, varying the second clock frequency between frames 400, 402, 404 for assembly 150 (FIG. 1A) could be implemented as either a hardware or a firmware solution.

The noise attenuation techniques described for the apparatus of either FIGS. 3 and 5 may be combined with the technique of varying the second clock frequency between frames. For example, the electrical circuit may be configured to both vary the second clock frequency between frames while also chopping up or discretizing each frame into smaller periods during which a processing decision is made. The approach of varying the second clock frequency between frames may alternatively or additionally include the use of no-op commands to more evenly distribute power consumption across each frame.

Some embodiments relate to a microphone assembly including a housing, the housing further including a base, a cover, and a sound port. The microphone assembly further includes an acoustic transducer and an electrical circuit, both of which are disposed in the housing. The electrical circuit is configured to convert sound waves received by the transducer into chunks or frames of digital data. The electrical circuit is further configured to process the digital data during discrete time periods distributed throughout each frame in a randomized or pseudo-randomized fashion to reduce acoustical noise in the resulting audio signal. The decision that determines whether or not to process digital data may be made before each of the discrete time periods (e.g., during a previous discrete time period).

In some aspects, the electrical circuit may be further configured to process no-operation commands during a second portion of the frame duration, after the processing of all digital data contained within the frame has completed. The power consumption associated with the no-operation commands may be substantially the same as the power consumption required to process the digital data during each discrete time period.

Some embodiments relate to a method of reducing acoustic noise in a microphone assembly. The method includes converting an electrical signal into digital data representing the acoustic signal and processing the digital data in time frames of a sequence of time frames. The method further includes subdividing each frame into discrete time periods during which digital data are either processed or not processed in a randomized or pseudo-randomized fashion.

Some embodiments relate to a microphone assembly that includes an electrical circuit configured to vary a clock frequency between adjacent frames, independent of a clock frequency used by a data sampling process. The electrical circuit may combine more than one signal processing technique to reduce acoustic noise in the resulting signal.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A microphone assembly comprising:
    a housing including a base, a cover and a sound port;
    electrical contacts disposed on an outer surface of the housing;
    an acoustic transducer disposed in the housing;
    an electrical circuit disposed in the housing, an input of the electrical circuit coupled to an output of the transducer, the electrical circuit electrically coupled to the electrical contacts,
    the electrical circuit including an analog-to-digital converter configured to convert an output signal from the transducer to digital data,
    the electrical circuit configured to process the digital data during discrete time periods distributed throughout frames of a sequence of frames,
    for a given frame, at least some discrete time periods during which digital data are processed are adjacent discrete time periods during which digital data are not processed, and
    the distribution of discrete time periods during which digital data are processed is different from frame to frame.

2. The assembly of claim 1, wherein each frame has a duration corresponding to a frequency within a range of human perceptible frequencies.

3. The assembly of claim 1, wherein the housing is a bottom port device with the sound port disposed through the base, wherein the electrical contacts are located on the base, and wherein the transducer is a microelectromechanical systems (MEMS) transducer.

4. The assembly of claim 2, wherein:
the electrical circuit is configured to process the digital data in each frame during a first portion of the frame duration, and
the electrical circuit is configured to process no-operation commands during a second portion of the frame duration after processing all digital data in the frame, at least some discrete time periods during which no-operation commands are processed are adjacent discrete time periods during which no-operation commands are not processed, and the distribution of discrete time periods during which no-operation commands are processed is different from frame to frame.

5. The assembly of claim 4, wherein the electrical circuit is configured to process digital data and no-operation commands within the frame based on a decision, with a random outcome, made before each of the discrete time periods.

6. The assembly of claim 2, wherein power consumption of the electrical circuit during discrete time periods during which digital data and no-operation commands are processed is greater than power consumption of the electrical circuit during discrete time periods during which digital data and no-operation commands are not processed.

7. The assembly of claim 1, wherein each frame has a frame duration, wherein:
the electrical circuit is configured to process the digital data in each frame during a first portion of the frame duration,
the electrical circuit is configured to process no-operation commands during a second portion of the frame duration after processing all digital data in the frame, at least some discrete time periods during which no-operation commands are processed are adjacent discrete time periods during which no-operation commands are not processed, and the distribution of discrete time periods during which no-operation commands are processed is different from frame to frame, and
power consumption of the electrical circuit during the discrete time periods during which digital data and no-operation commands are processed is greater than power consumption of the electrical circuit during the discrete time periods during which digital data and no-operation commands are not processed.

8. A method in a microphone assembly having an acoustic transducer and an electrical circuit disposed in a housing with a sound port, the method comprising:
converting an acoustic signal to an electrical signal;
converting the electrical signal into digital data representing the acoustic signal;
processing the digital data in time frames of a sequence of time frames by intermittently processing the digital data in a given time frame during a plurality of discrete time periods distributed throughout a duration of the given time frame, wherein at least some discrete time periods during which digital data are processed are adjacent discrete time periods during which digital data are not processed; and
varying a distribution of discrete time periods during which digital data are processed from one time frame to a subsequent time frame of the plurality of time frames.

9. The method of claim 8, wherein varying the distribution of discrete time periods during which digital data are processed from the one time frame to the subsequent time frame of the plurality of time frames includes randomly varying the distribution.

10. The method of claim 8, wherein the duration of each time frame of the plurality of time frames corresponds to a frequency within a range of human perceptible frequencies.

11. The method of claim 8, wherein the plurality of discrete time periods during which digital data are processed are distributed over a first duration of the given time frame, the method further comprising:
intermittently processing no-operation commands during a second duration of the given time frame after the first duration, such that the second duration includes a plurality of discrete time periods during which no-operation commands are processed and are distributed throughout the second duration, at least some discrete time periods of the plurality of discrete time periods during which no-operations commands are processed are adjacent discrete time periods during which no-operation commands are not processed, and a distribution of the plurality of discrete time periods during which no-operation commands are processed are varied from the one time frame to the subsequent time frame of the plurality of time frames.

12. The method of claim 11, wherein intermittently processing no-operation commands during the second duration of the given time frame includes processing the no-operation commands such that a power consumption of the electrical circuit during discrete time periods during which digital data and no-operation commands are processed is greater than a power consumption of the electrical circuit during discrete time periods during which digital data and no-operation commands are not processed.

13. The method of claim 8, further comprising varying a clock frequency corresponding to processing the digital data from the one time frame to the subsequent time frame of the plurality of time frames.

14. The method of claim 13, further comprising maintaining a constant clock frequency corresponding to converting an output of the acoustic transducer into digital data throughout the plurality of time frames.

15. The method of claim 13, wherein varying the clock frequency corresponding to processing the digital data from the one time frame to the subsequent time frame of the plurality of time frames includes varying the clock frequency randomly.

16. The method of claim 8, wherein intermittently processing the digital data in the given time frame is based on a decision, with a random outcome, made before each of the discrete time periods.

17. A microphone assembly comprising:
a housing including a base, a cover and a sound port;
electrical contacts disposed on an outer surface of the housing;
an acoustic transducer disposed in the housing;
an electrical circuit disposed in the housing, an input of the electrical circuit coupled to an output of the acoustic transducer, the electrical circuit electrically coupled to the electrical contacts,
the electrical circuit including an analog-to-digital converter configured to convert an output signal from the transducer to digital data at a first clock frequency,
the electrical circuit configured to:
process the digital data in time frames of a sequence of a plurality of time frames at a second clock frequency; and
vary the second clock frequency from one time frame to a subsequent time frame of the plurality of time frames.

18. The assembly of claim 17, wherein the electrical circuit is configured to maintain the first clock frequency constant from the one time frame to the subsequent time frame of the plurality of time frames.

19. The assembly of claim 17, wherein the electrical circuit is configured to randomly vary the second clock frequency from the one time frame to the subsequent time frame of the plurality of time frames.

20. The assembly of claim 17, wherein the electrical circuit is configured to process the digital data during discrete time periods distributed throughout each of the time frames of the sequence of the plurality of time frames, wherein for a given time frame, at least some discrete time periods during which digital data are processed are adjacent discrete time periods during which digital data are not processed, and wherein the distribution of discrete time periods during which digital data are processed is different from the one time frame to the subsequent time frame of the plurality of time frames.

* * * * *